US010871854B2

United States Patent
Ng et al.

(10) Patent No.: US 10,871,854 B2
(45) Date of Patent: Dec. 22, 2020

(54) METHOD AND SYSTEM FOR EXTENDING TOUCH-SENSING FUNCTIONALITY OF A TOUCH SCREEN WITH PROXIMALLY POSITIONED PHYSICAL KEYS

(71) Applicant: Solomon Systech (Shenzhen) Limited, Shenzhen (CN)

(72) Inventors: Wai Hon Ng, Hong Kong (HK); Wing Chi Stephen Chan, Hong Kong (HK); Chi Wai Lee, Hong Kong (HK); Chun Hung Lai, Hong Kong (HK); Johnkid Lo, Hong Kong (HK)

(73) Assignee: Solomon Systech (Shenzhen) Limited, Shenzhen (CN)

( * ) Notice: Subject to any disclaimer, the term of this patent is extended or adjusted under 35 U.S.C. 154(b) by 0 days.

(21) Appl. No.: 16/411,102

(22) Filed: May 13, 2019

(65) Prior Publication Data
US 2020/0363897 A1 Nov. 19, 2020

(51) Int. Cl.
*G06F 3/041* (2006.01)
*G06F 3/0485* (2013.01)
*G06F 3/0488* (2013.01)

(52) U.S. Cl.
CPC .......... *G06F 3/0416* (2013.01); *G06F 3/0485* (2013.01); *G06F 3/04883* (2013.01)

(58) Field of Classification Search
CPC ...... G06F 1/163; G06F 3/0362; G06F 3/0482; G06F 3/0485; G06F 3/0488
See application file for complete search history.

(56) References Cited

U.S. PATENT DOCUMENTS

| | | | |
|---|---|---|---|
| 10,133,405 B2 | 11/2018 | Ng et al. | |
| 2016/0170608 A1* | 6/2016 | Zambetti | G06F 3/0362 715/810 |
| 2016/0349874 A1* | 12/2016 | Hsu | G06F 3/0412 |
| 2017/0031498 A1* | 2/2017 | Jen | G06F 3/044 |
| 2019/0018515 A1 | 1/2019 | Chan et al. | |

* cited by examiner

*Primary Examiner* — Nelson M Rosario
(74) *Attorney, Agent, or Firm* — Idea Intellectual Limited; Margaret A. Burke; Sam T. Yip

(57) ABSTRACT

A computing device for interacting with a user, comprising: a touch-sensing enabled display panel comprising one or more touch sensors for sensing an on-screen touch and one or more physical keys being positioned adjacent to edges of the display panel and configured to serve as off-screen keys for sensing an off-screen touch. The touch-sensing functionality is extended by coupling the touch screen with proximally positioned physical keys for detecting touch gesture such that additional gestures can be detected and in turn enhancing the computing device's user experience.

18 Claims, 22 Drawing Sheets

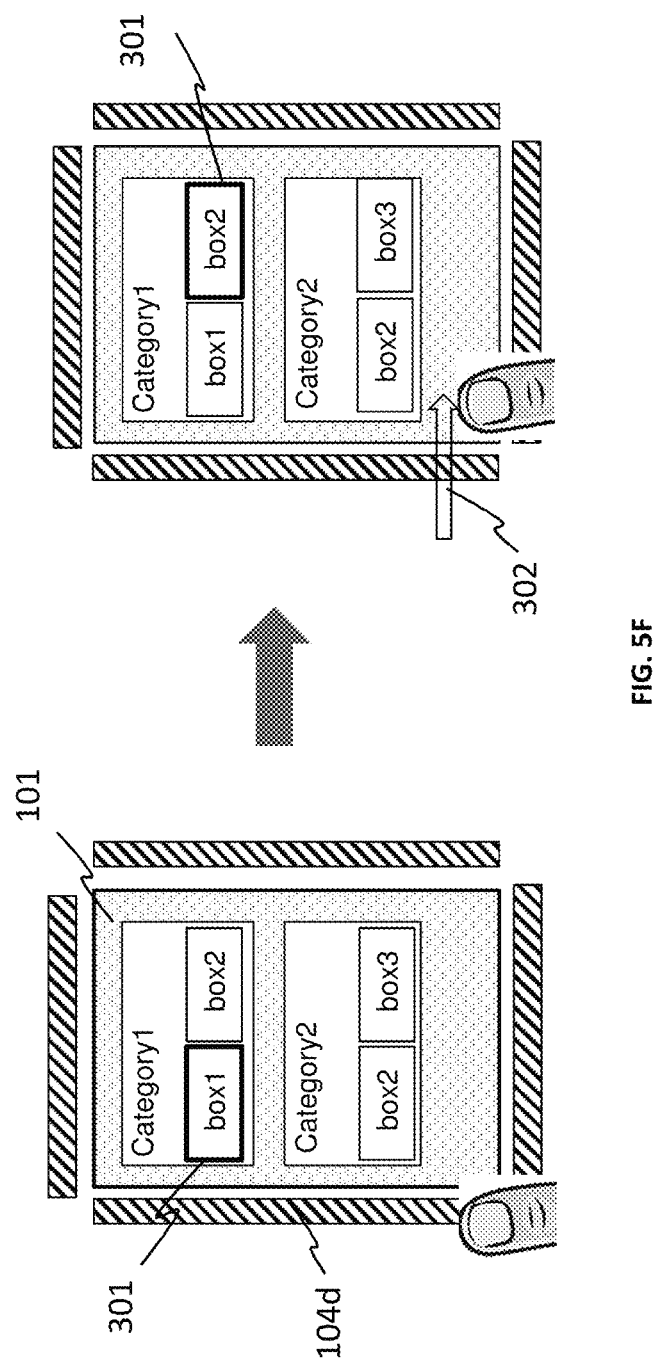

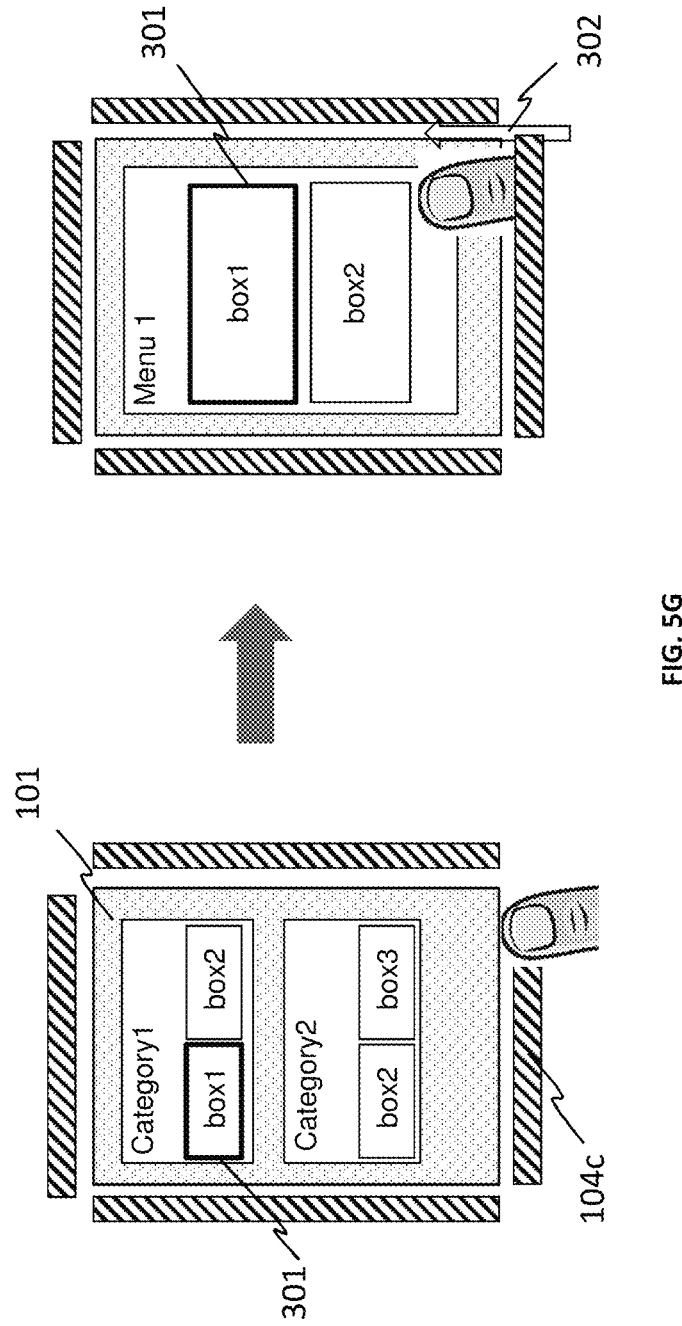

METHOD AND SYSTEM FOR EXTENDING TOUCH-SENSING FUNCTIONALITY OF A TOUCH SCREEN WITH PROXIMALLY POSITIONED PHYSICAL KEYS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application is related to U.S. Pat. No. 10,133,405 filed Nov. 11, 2016 and U.S. patent application Ser. No. 15/793,987 filed Oct. 26, 2017; the disclosures of which are incorporated by reference in their entireties.

FIELD OF THE INVENTION

This present invention generally relates to touch-sensing-enabled display panels. In particular, the present invention relates to extending touch-sensing functionality of a touch-sensing-enabled display panel by coupling the touch-sensing-enabled display panel with proximally positioned physical electro-mechanical buttons or keys for detecting touch gesture.

BACKGROUND OF THE INVENTION

While touch screens are becoming the main stream implements for user interaction in portable electronic devices such as mobile phones and tablets, they may have limitation in supporting single action control which are crucial in some potentially hazardous situations such as in a moving vehicle. Touch screens may also have limitation in providing tactile feedback which are important to user experience in some applications such as gaming. In many implementations, physical electro-mechanical buttons or keys, such as switching buttons and thumb sticks, are used alongside a touch screen to support single action control and provide tactile feedback.

SUMMARY OF THE INVENTION

One object of the present invention is to extend the touch-sensing functionality of a touch screen of a computing device by coupling the touch screen with proximally positioned physical electro-mechanical buttons or keys for detecting touch gesture such that additional gestures can be detected and in turn enhancing the computing device's user experience.

In accordance to one embodiment, the present invention provides a computing device for interacting with a user, comprising: a touch-sensing enabled display panel comprising one or more touch sensors configured for sensing an on-screen touch on the display panel to generate on-screen touch-sensing signals; one or more physical keys being positioned adjacent to edges of the display panel and configured to serve as off-screen keys for sensing an off-screen touch to generate off-screen touch-sensing signals; and a processor configured to be communicable with the display panel and the physical keys, to receive and analyze the on-screen touch-sensing signals and off-screen touch-sensing signals for identifying a touch gesture.

Preferably, the identifying of the touch gesture comprises:
a) determining an on-screen touch time from the on-screen touch-sensing signals;
b) determining an off-screen touch time from the off-screen touch-sensing signals;
c) determining whether the touch gesture is a directional (inward from outside of the touch-display panel's touch-sensing area to within it or outward from within the touch-display panel's touch-sensing area to outside of it) movement by comparing a time difference between the on-screen touch time and the off-screen touch time to a maximum threshold and a minimum threshold, wherein the touch gesture is determined to be a directional movement between the display panel and the physical keys when the time difference is less than the maximum threshold and larger than the minimum threshold; and
d) determining the direction of the directional movement, when the touch gesture is determined to be a directional movement between the display panel and the physical keys, in accordance with sequence of occurrence of the on-screen touch and the off-screen touch.

Alternatively, the identifying of the touch gesture comprises:
a) determining an on-screen touch time from the on-screen touch-sensing signals;
b) determining an off-screen touch time from the off-screen touch-sensing signals;
c) determining whether the touch gesture is a directional (inward from outside of the touch-display panel's touch-sensing area to within it or outward from within the touch-display panel's touch-sensing area to outside of it) movement by comparing a time difference between the on-screen touch time and the off-screen touch time to a threshold, wherein the touch gesture is determined to be a directional movement between the display panel and the physical keys when the time difference is equal or less than the threshold; and
d) determining direction of the directional movement, when the touch gesture is determined to be a directional movement between the display panel and the physical keys, in accordance with sequence of occurrence of the on-screen touch and the off-screen touch.

The processor is further configured, in response to the detected directional movement gestures, to facilitate user interaction such as switching between items or scrolling of contents in the graphical user interface being displayed on the display panel.

Other aspects of the present invention are disclosed as illustrated by the embodiments hereinafter.

BRIEF DESCRIPTION OF THE DRAWINGS

Embodiments of the invention are described in more detail hereinafter with reference to the drawings, in which:

FIGS. 5A-5G depict an illustration of switching of items in a user interface being facilitated with detected directional movements between the physical keys and the touch-sensing enabled display panel of FIG. 4;

DETAILED DESCRIPTION

As used herein, a computing device means an electronic device having at least computer processing capability and a touch-sensing-enabled display for interacting with a user of the computing device. Examples of the computing device include a smartphone, a smart watch, a tablet computer, a digital camera having a touch-sensing-enabled display for interacting with a photographer, and any consumer-electronic device having such touch-sensing-enabled display for user interaction. It is also possible that the computing device is a part of a larger computing equipment. For example, a user-interface electronic module in the aforementioned digital camera is deemed to be a computing device if the module includes a touch-sensing-enabled display and a processor for controlling the display.

In the following description, systems and methods for detecting touch gesture by coupling a touch screen with proximally positioned physical keys are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
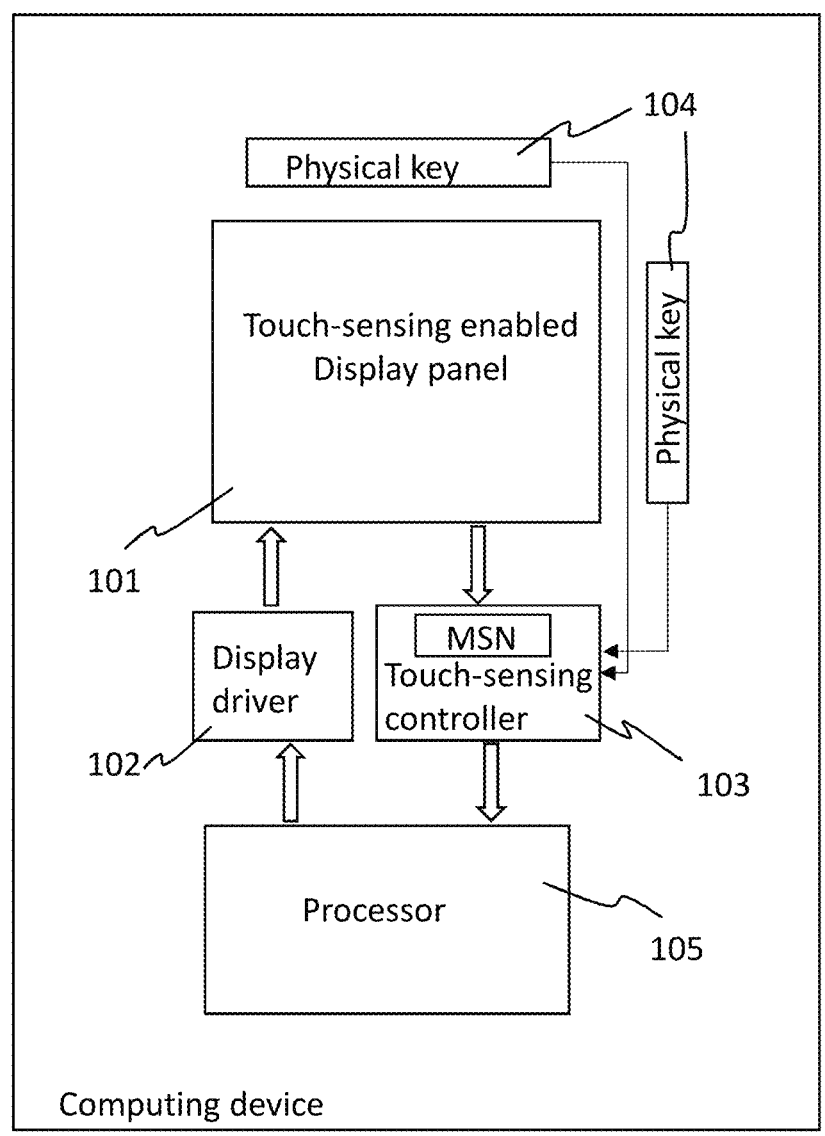
FIG. 1A depicts a schematic block diagram of a computing device in accordance with an embodiment of the present invention.

FIG. 1A depicts a schematic block diagram of a computing device 100 in accordance with an embodiment of the present invention. The computing device may comprise a touch-sensing enabled display panel 101, a display driver 102, a touch-sensing controller 103, one or more physical keys 104, and a processor 105. The display driver 102, touch sensing controller 103 and the processor 105 may be implemented respectively in discrete integrated circuit (IC) chips. Alternatively, the display driver 102, touch sensing controller 103 and the processor 105 may be combined with each other and implemented in one or more integral IC chips.

The touch-sensing enabled display panel 101 may comprise one or more touch sensors for sensing an on-screen touch on the display panel and generating on-screen touch-sensing signals. A configuration of the touch sensors may be animated as one or more on-screen keys on a graphical user interface to facilitate user input.

The display driver 102 may be configured for driving the display panel 101 to display a graphical user interface including the one or more on-screen keys corresponding to the configuration of the touch sensors.

The physical keys 104 may be positioned adjacent to the edges of the display panel 101 and configured to serve as off-screen keys for sensing an off-screen touch to generate off-screen touch-sensing signals.

The touch-sensing controller 103 may be communicable with the touch-sensing enabled display panel 101 and the physical keys 104, and configured to receive the on-screen touch-sensing signals from the display panel 101 to generate on-screen touch data and receive the off-screen touch-sensing signals from the physical keys 104 to generate off-screen touch data.

The processor 105 may be communicable with the display driver 102 and the touch-sensing controller 103, and configured to receive the on-screen and off-screen touch data from the touch-sensing controller 103, to analyze the on-screen and off-screen touch data for identifying a touch gesture, to determine a new graphical user interface in response to the identified touch gesture, to generate the new graphical user interface bitmap for the display driver 102 to reconfigure the graphical user interface being displayed in the display panel 101.

Preferably, the process of identifying the touch gesture being operated by the processor 105 may comprise:
 a) determining an on-screen touch time from the generated on-screen touch data;
 b) determining an off-screen touch time from the generated off-screen touch data;
 c) determining whether the touch gesture is a directional (inward from outside of the touch-display panel's touch-sensing area to within it or outward from within the touch-display panel's touch-sensing area to outside of it) movement by comparing a time difference between the on-screen touch time and the off-screen touch time to a maximum threshold and a minimum threshold, wherein the touch gesture is determined to be a directional movement between the display panel and the physical keys when the time difference is less than the maximum threshold and larger than the minimum threshold; and
 d) determining direction of the directional movement, when the touch gesture is determined to be a directional movement between the display panel and the physical keys, in accordance with sequence of occurrence of the on-screen touch and the off-screen touch.

Alternatively, the process of identifying the touch gesture being operated by the processor 105 may comprise:
 a) determining an on-screen touch time from the on-screen touch-sensing signals;
 b) determining an off-screen touch time from the off-screen touch-sensing signals;
 c) determining whether the touch gesture is a directional (inward from outside of the touch-display panel's touch-sensing area to within it or outward from within the touch-display panel's touch-sensing area to outside of it) movement by comparing a time difference between the on-screen touch time and the off-screen touch time to a threshold, wherein the touch gesture is determined to be a directional movement between the display panel and the physical keys when the time difference is equal or less than the threshold; and d) determining direction of the directional movement, when the touch gesture is determined to be a directional movement between the display panel and the physical keys, in accordance with sequence of occurrence of the on-screen touch and the off-screen touch.

The directional movement being determined may be at least one of: sliding up movement, sliding down movement, sliding left movement and sliding right movement between the display panel and one of the physical keys.

Figure 1B:
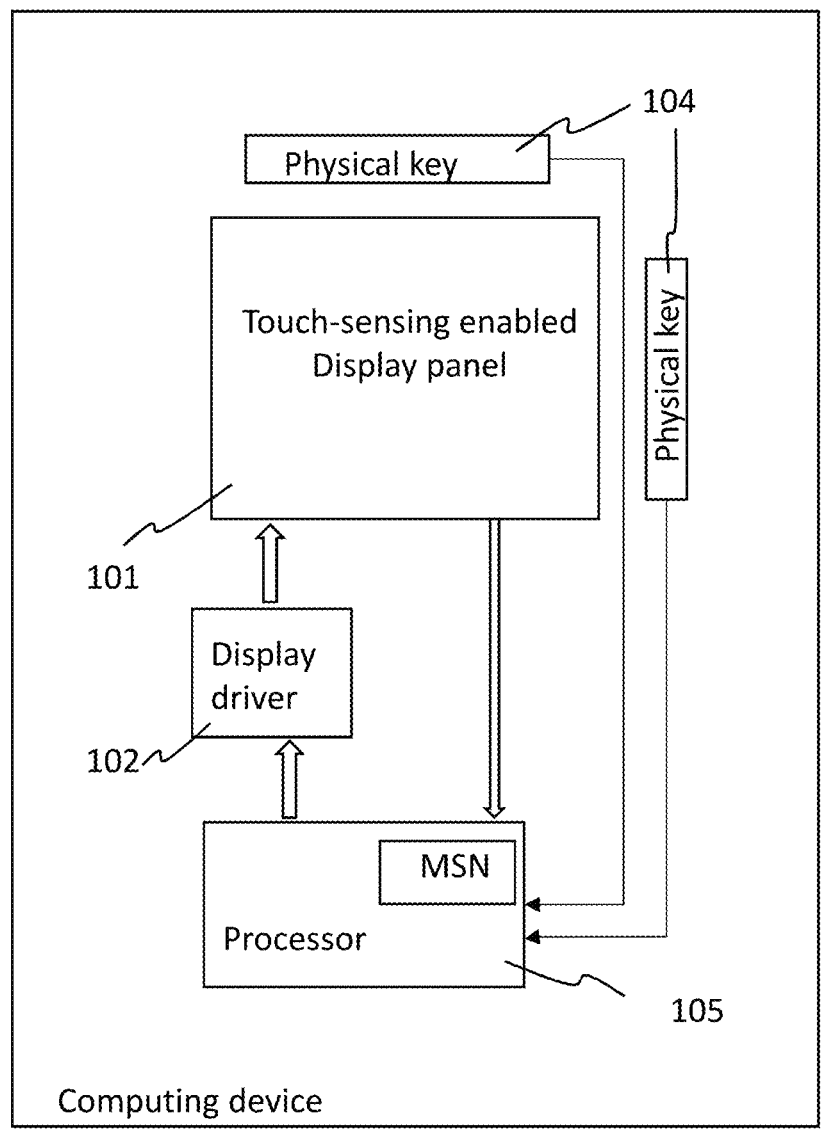
FIG. 1B depicts a schematic block diagram of a computing device in accordance with another embodiment of the present invention.

The processor 105 may be further configured, in response to the detected directional movement gesture, to facilitate user interaction such as switching between items or scrolling of contents in the graphical user interface being displayed on the display panel FIG. 1B depicts a schematic block diagram of a computing device 100 in accordance with another embodiment of the present invention. The processor 105 may be configured to be communicable with the display driver 102, the display panel 101 and the physical keys 104, to receive and analyze the on-screen touch-sensing signals and off-screen touch-sensing signals for identifying a touch gesture.

Figure 2:
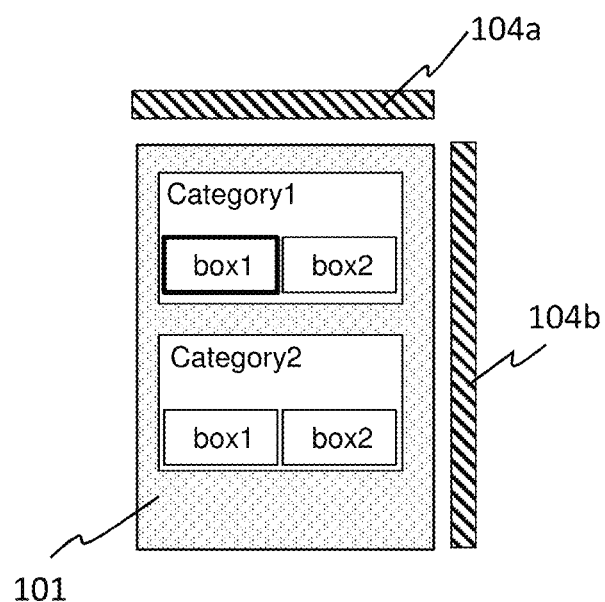
FIG. 2 illustrates an exemplary configuration of physical keys embedded alongside a touch-sensing enabled display panel in accordance with an embodiment of the present invention.

Referring to FIG. 2, the physical keys may include a first key 104a positioned adjacent to a horizontal top edge of the touch-sensing enabled display panel 101 to serve as a first off-screen key and a second key 104b positioned adjacent to a vertical right edge of the touch-sensing enabled display panel 101 to serve as a second off-screen key. Accordingly, the first key 104a may be used, in association with the display panel, to detect an upward/downward sliding movement gesture along the vertical axis of the display panel 101; and the second key 104b may be used, in association with the display panel, to detect a rightward/leftward sliding movement gesture along the horizontal axis of the display panel.

FIGS. 3A-3F illustrate how switching of items in a graphical user interface is facilitated with sliding movements between the first/second physical keys and the touch-sensing enabled display panel.

Figure 3A:
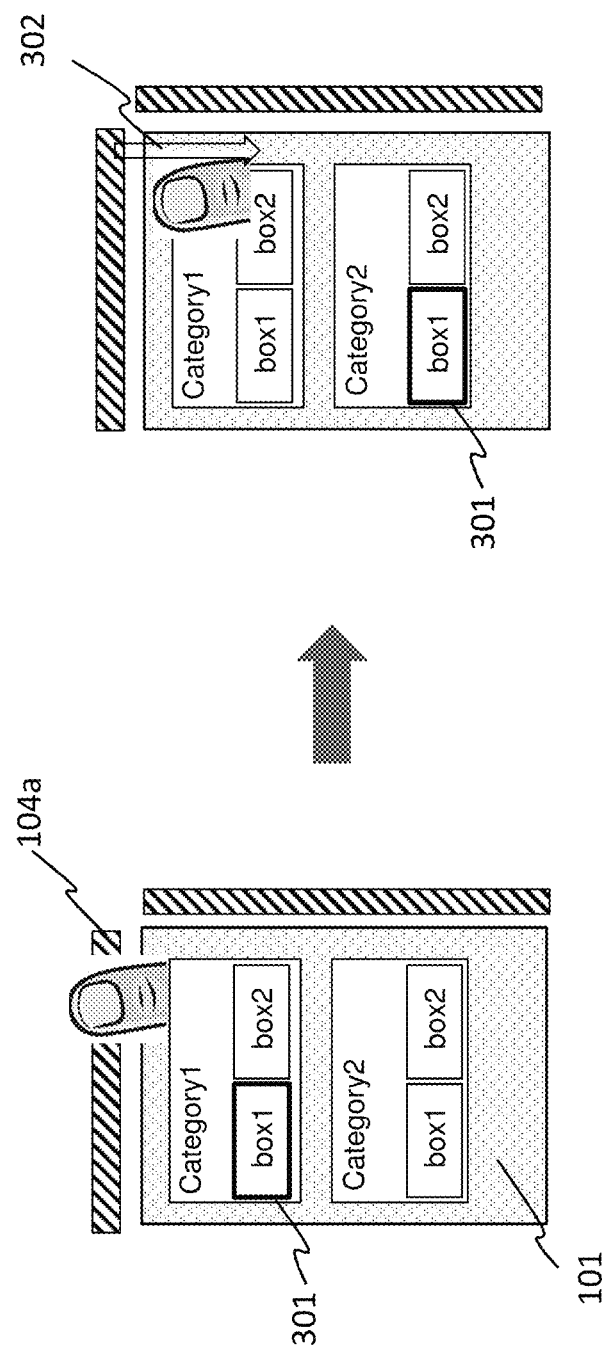
FIGS. 3A-3G depict an illustration of switching of items in a user interface being facilitated with detected directional movements between the physical keys and the display panel of FIG. 2.

FIG. 3A shows a switching action from an item "box1" under "Category1" to an item "box1" under "Category2", as indicated with a highlighting box 301, in response to a sliding down movement, as represented by an arrow 302, from the first physical key 104a to the display panel 101.

Figure 3B:
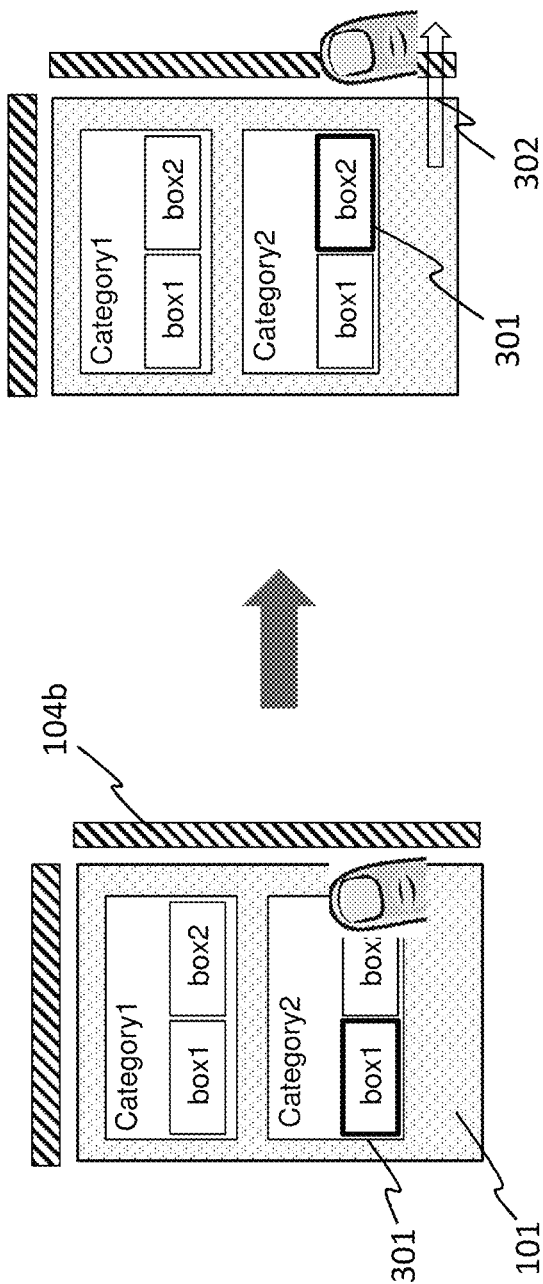

FIG. 3B shows a switching action from the item "box1" under "Category 2" to an item "box2" under "Category2" as indicated with the highlighting box 301, in response to a sliding right movement, as represented by the arrow 302, from the display panel 101 to the second physical key 104b.

Figure 3C:
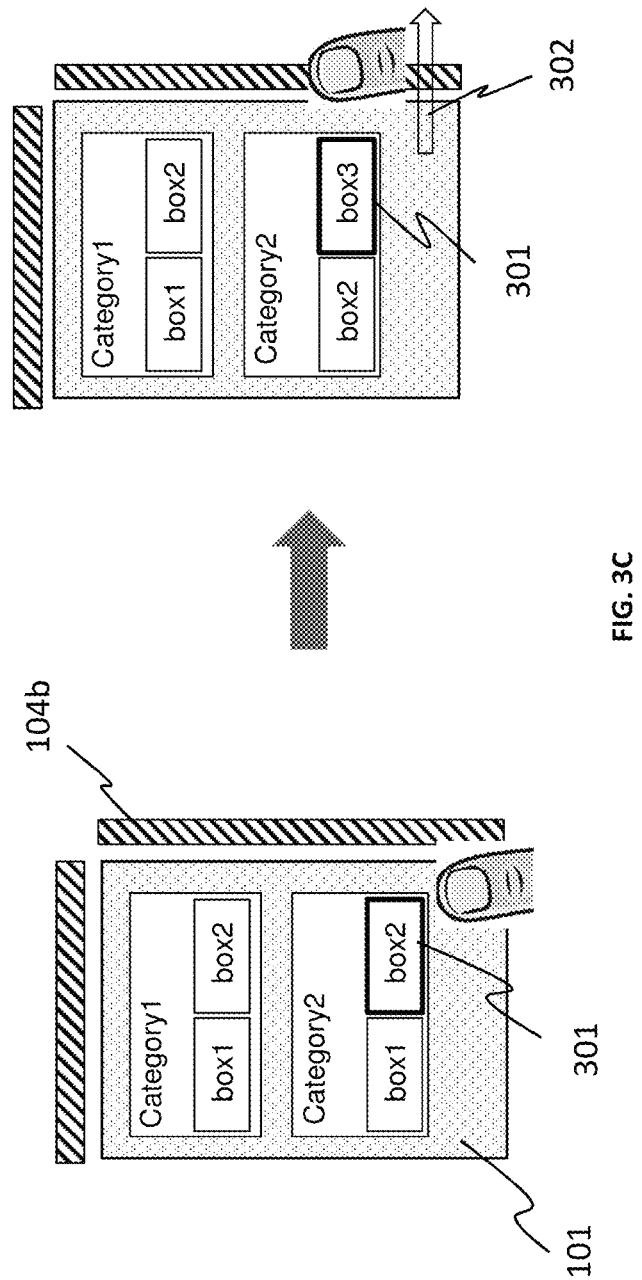

FIG. 3C shows a switching action from the item "box2" under "Category 2" to an item "box3" under "Category2" which is scrolled in as a new content, as indicated with the highlighting box 301, in response to a sliding right movement, as represented by the arrow 302, from the display panel 101 to the second physical key 104b.

Figure 3D:
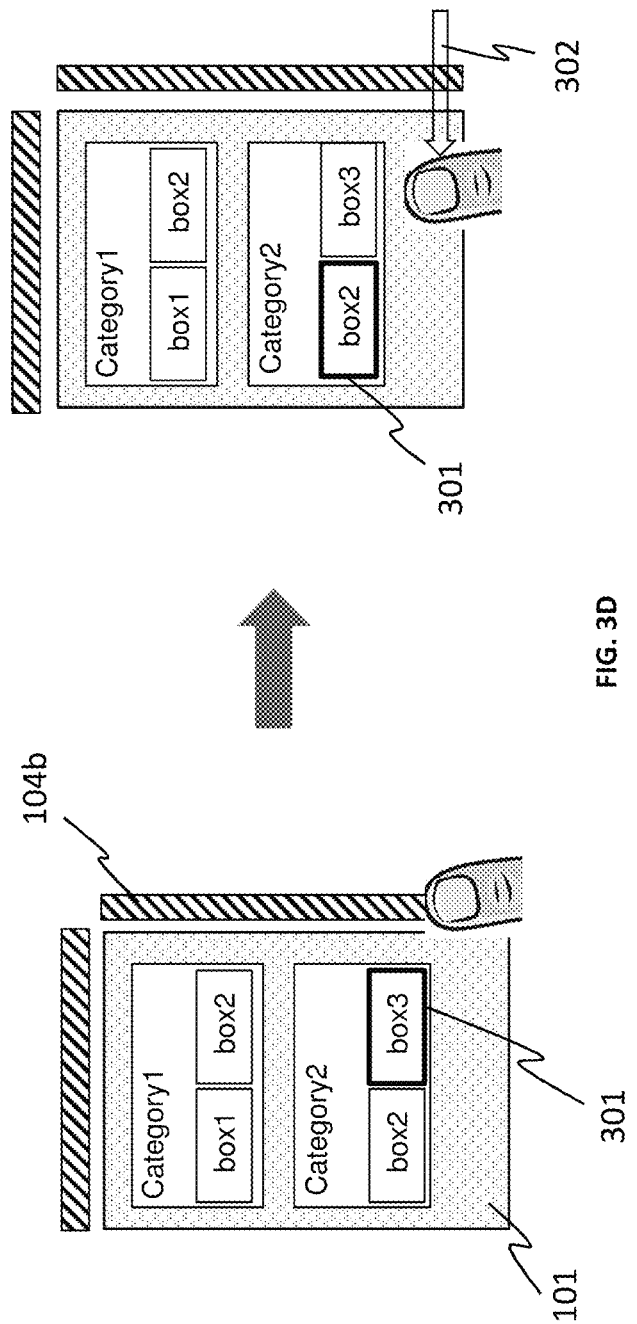

FIG. 3D shows a switching action from the item "box3" under "Category 2" to the item "box2" under "Category2", as indicated with the highlighting box 301, in response to a sliding left movement, as represented by the arrow 302, from the second physical key 104b to the display panel 101.

Figure 3E:
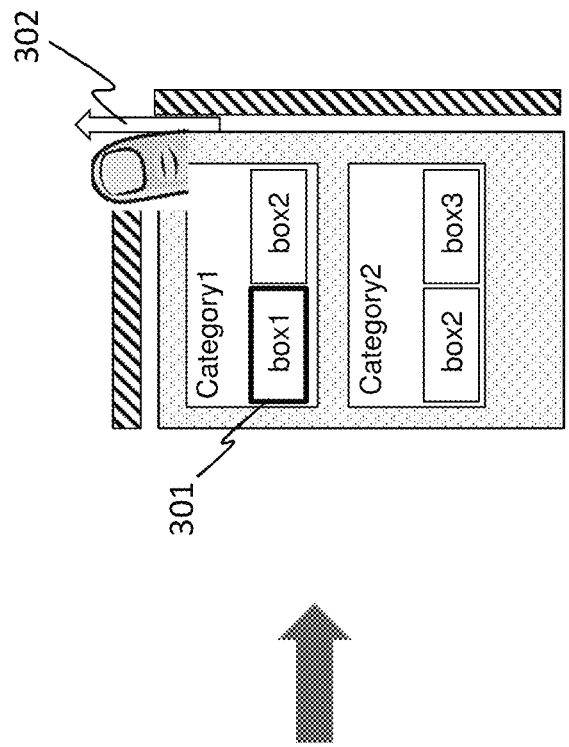
Figure 3E:
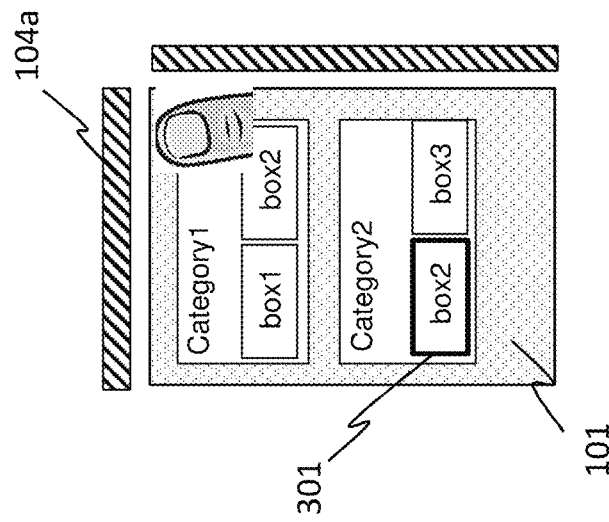

FIG. 3E shows a switching action from the item "box2" under "Category 2" to the item "box1" under "Category1", as indicated with the highlighting box 301, in response to a sliding up movement, as represented by the arrow 302, from the display panel 101 to the first physical key 104a.

Figure 3F:
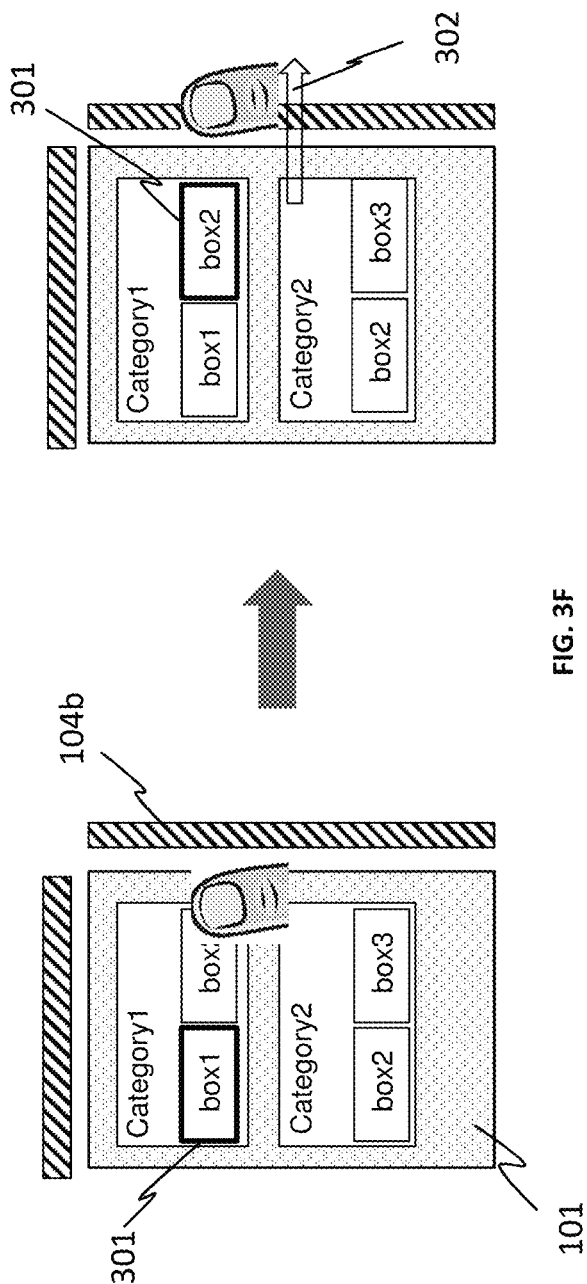

FIG. 3F shows a switching action from the item "box1" under "Category 1" to the item "box2" under "Category1", as indicated with the highlighting box 301, in response to a sliding right movement, as represented by the arrow 302, from the display panel 101 to the second physical key 104b.

Figure 3G:
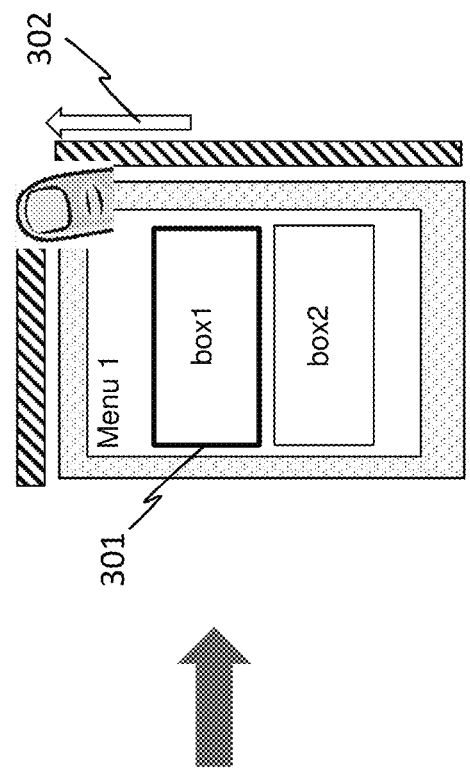
Figure 3G:
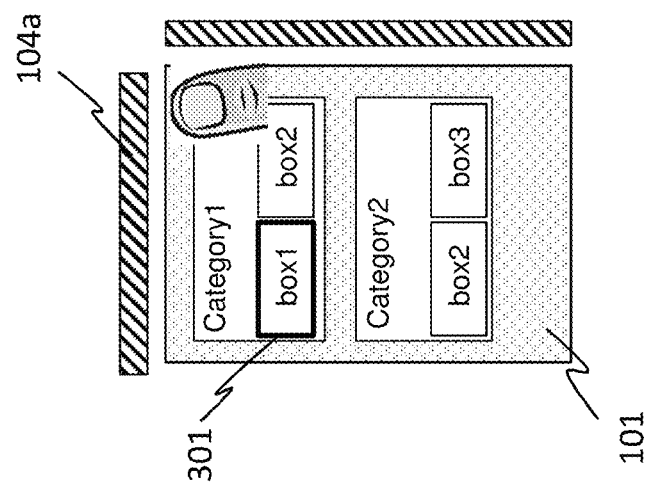

FIG. 3G shows a switching action from the item "box1" under "Category 1" to a new item "box1" under "Menu1", as indicated with the highlighting box 301, in response to another sliding up movement, as represented by the arrow 302, from the display panel 101 to the first physical key 104a.

Figure 4:
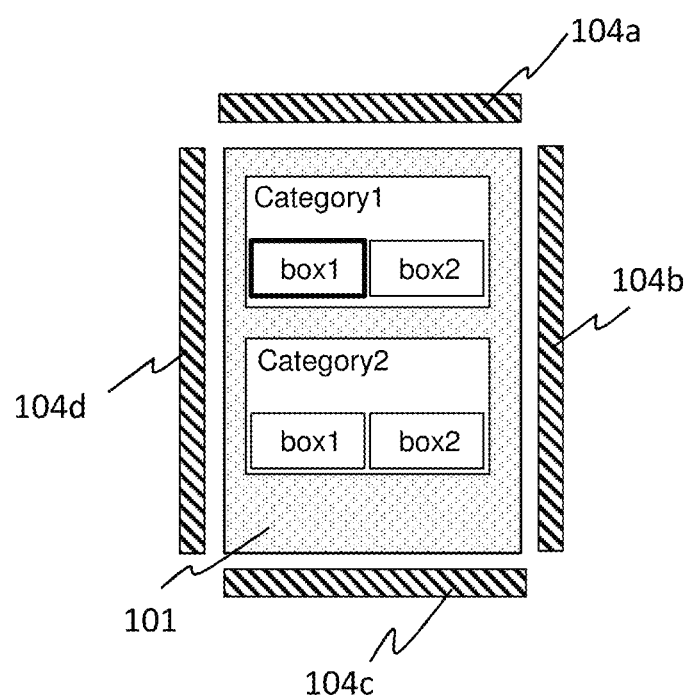
FIG. 4 illustrates an exemplary configuration of physical keys embedded alongside a touch-sensing enabled display panel in accordance with another embodiment of the present invention.

Referring FIG. 4, the physical keys may further include a third key 104c positioned adjacent to a horizontal bottom edge of the touch-sensing enabled display panel 101 to serve as a third off-screen key and a fourth key 104d positioned adjacent to a vertical left edge of the touch-sensing enabled display panel 101 to serve as a fourth off-screen key. Accordingly, the third key 104c may be used, in association with the display panel 101, to detect an upward/downward sliding movement gesture along the vertical axis of the display panel 101; and the fourth key 104d may be used, in association with the display panel 101, to detect a rightward/leftward sliding movement gesture along the horizontal axis of the display panel 101.

FIGS. 5A-5F illustrate how switching of items in a graphical user interface is facilitated with sliding movements between the third/fourth physical keys and the touch-sensing enabled display panel.

Figure 5A:
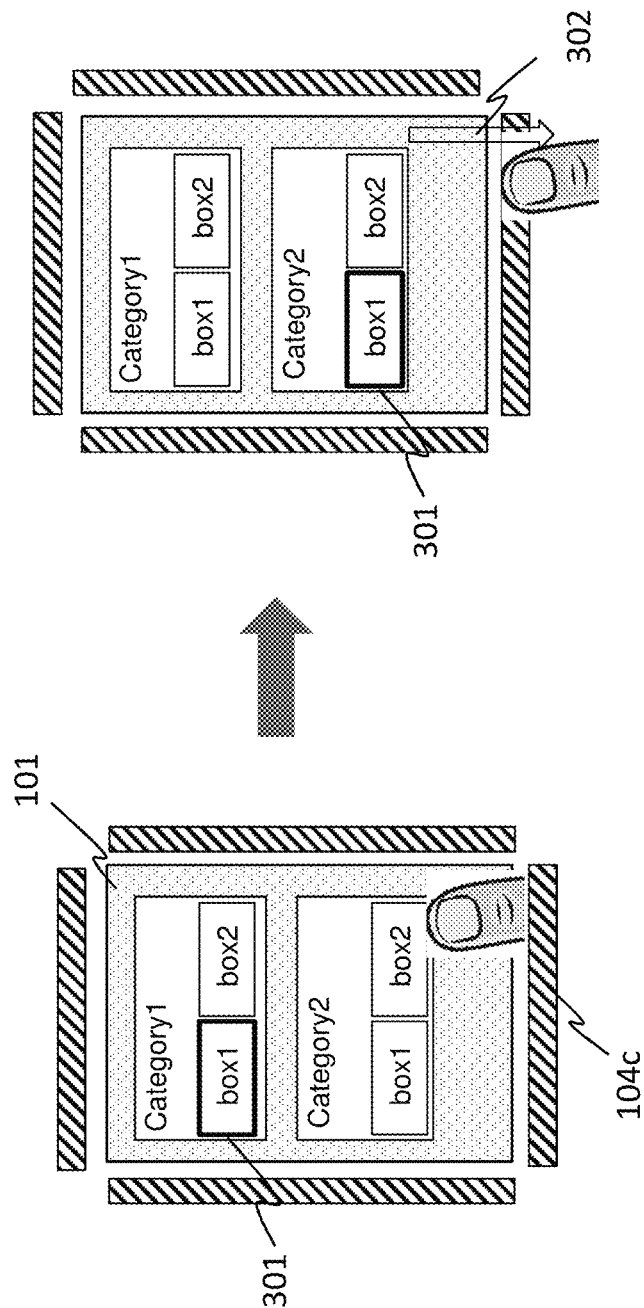

FIG. 5A shows a switching action from an item "box1" under "Category1" to an item "box1" under "Category2", as indicated with a highlighting box 301, in response to a sliding down movement, as represented by an arrow 302, from the display panel 101 to the third physical key 104c.

Figure 5B:
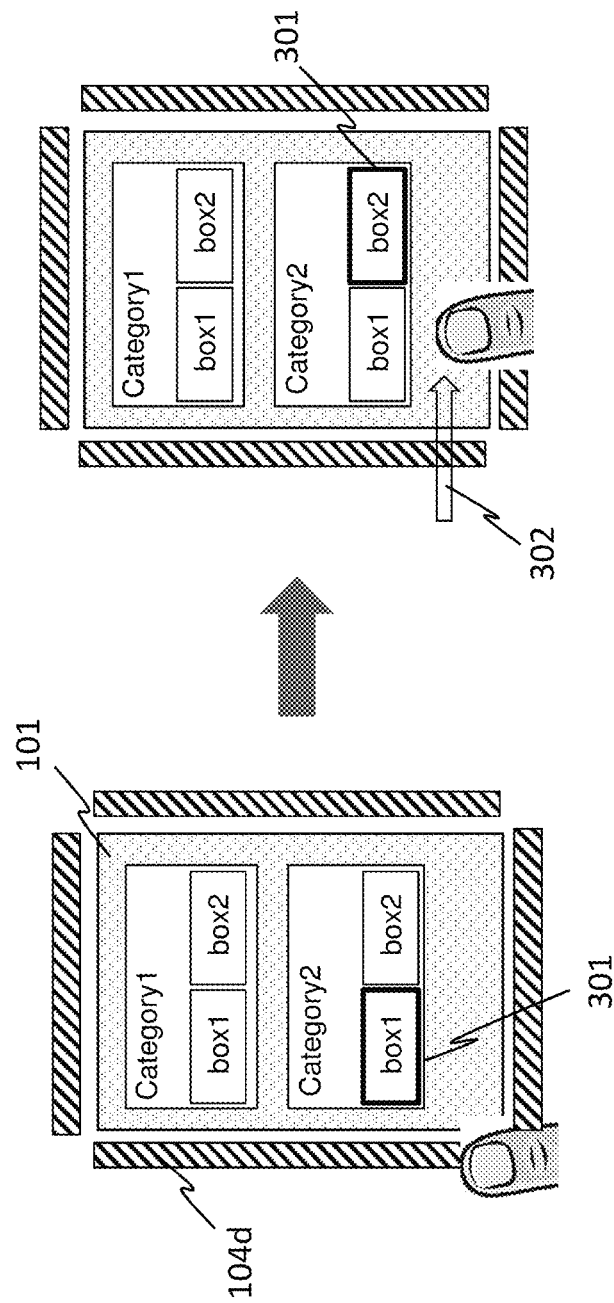

FIG. 5B shows a switching action from the item "box1" under "Category 2" to an item "box2" under "Category2" as indicated with the highlighting box 301, in response to a sliding right movement, as represented by the arrow 302, from the fourth physical key 104d to the display panel 101.

Figure 5C:
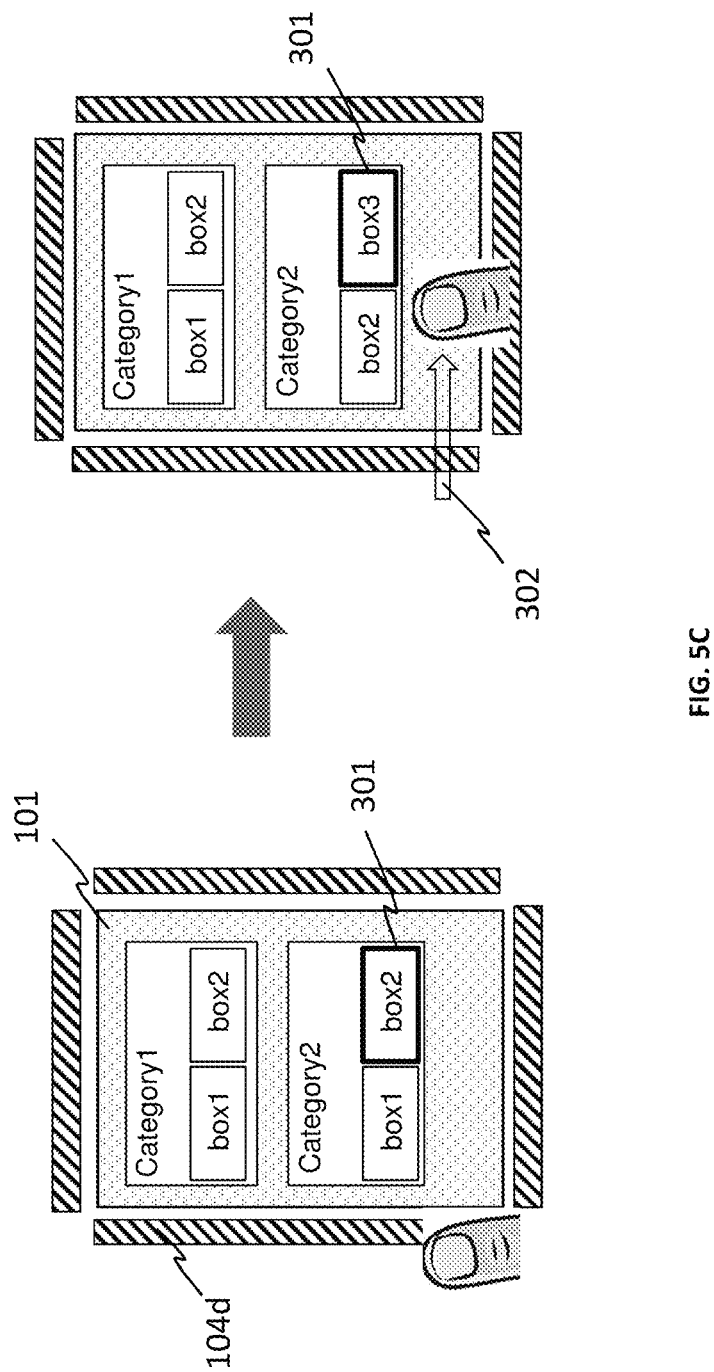

FIG. 5C shows a switching action from the item "box2" under "Category 2" to an item "box3" under "Category2" which is scrolled in as a new content, as indicated with the highlighting box 301, in response to a sliding right movement, as represented by the arrow 302, from the fourth physical key 104d to the display panel 101.

Figure 5D:
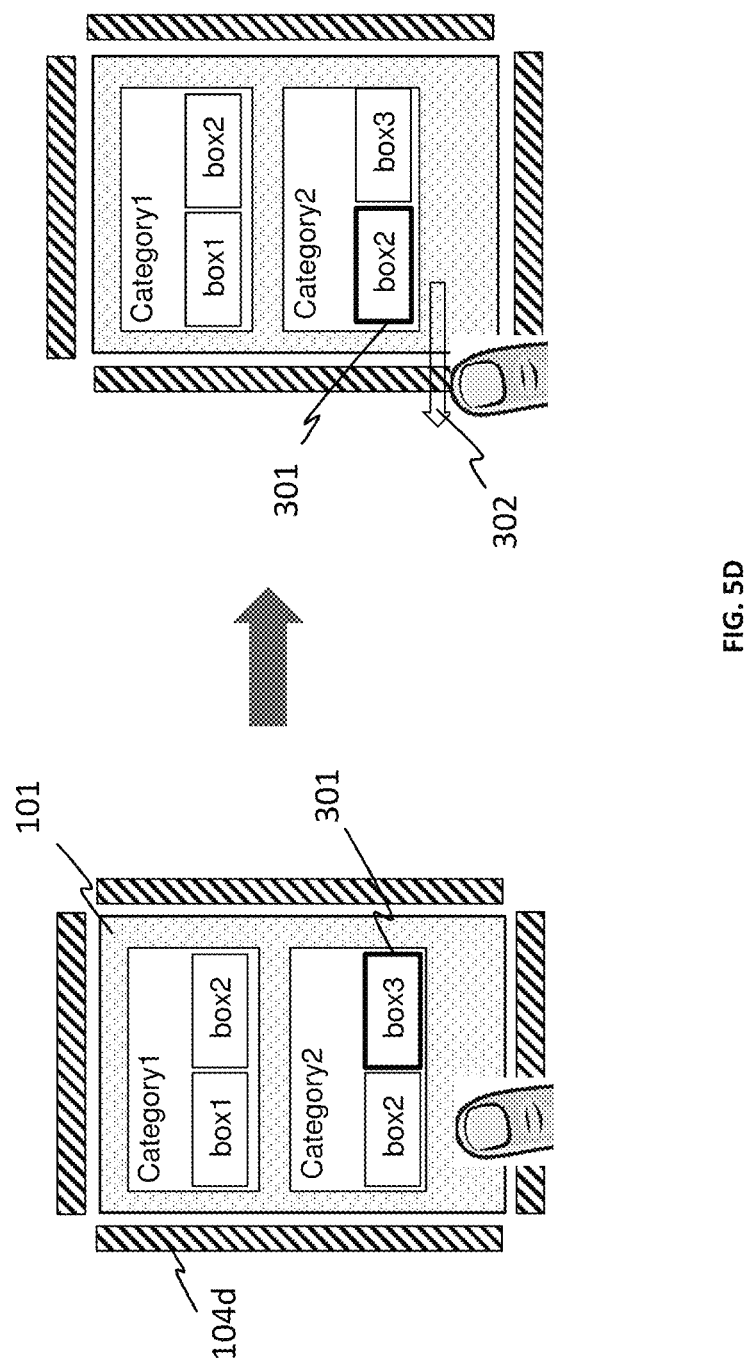

FIG. 5D shows a switching action from the item "box3" under "Category 2" to the item "box2" under "Category2", as indicated with the highlighting box 301, in response to a sliding left movement, as represented by the arrow 302, from the display panel 101 to the fourth physical key 104d.

Figure 5E:
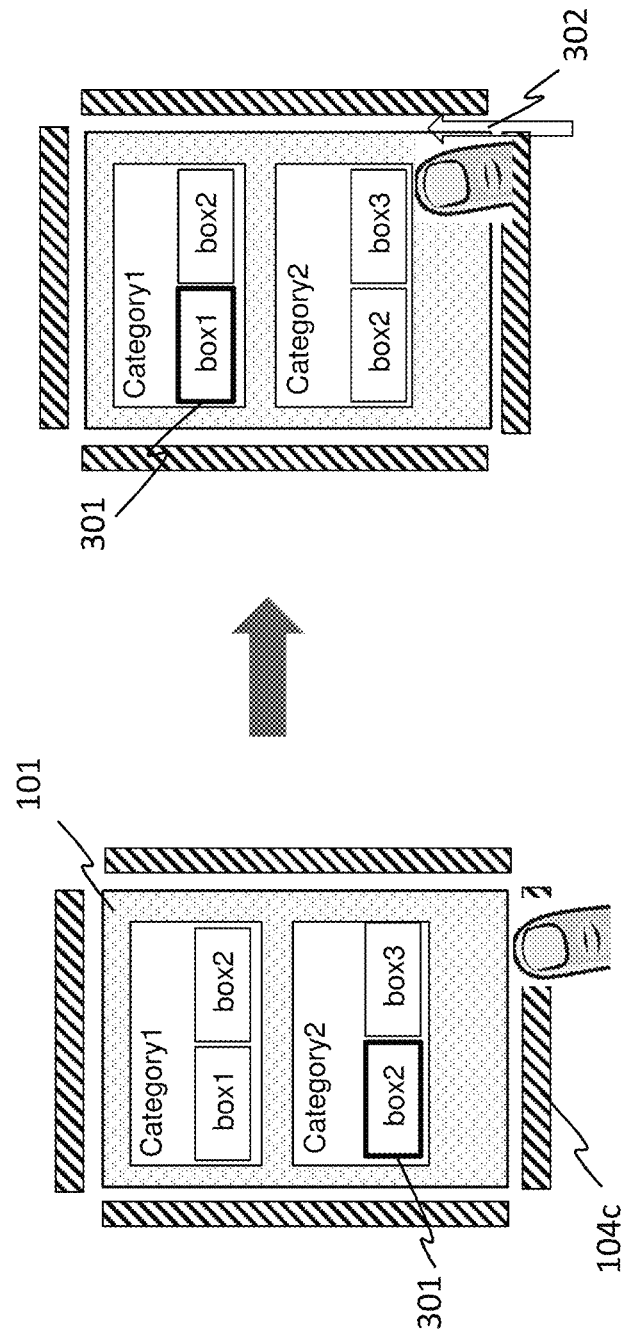

FIG. 5E shows a switching action from the item "box2" under "Category 2" to the item "box1" under "Category1", as indicated with the highlighting box 301, in response to a sliding up movement, as represented by the arrow 302, from the third physical key 104c to the display panel 101.

FIG. 5F shows a switching action from the item "box1" under "Category 1" to the item "box2" under "Category1", as indicated with the highlighting box 301, in response to a sliding right movement, as represented by the arrow 302, from the fourth physical key 104d to the display panel 101.

FIG. 5G shows a switching action from the item "box1" under "Category 1" to a new item "box1" under "Menu1", as indicated with the highlighting box 301, in response to another sliding up movement, as represented by the arrow 302, from the third physical key 104c to the display panel 101.

Although the working principles of the present invention are illustrated by the above-described embodiments primarily comprising rectangular shaped display panels with physical keys positioned alongside one or more of the four edges of the display panels facilitating the detections of upward/downward and/or leftward/rightward sliding movements, an ordinarily skilled person in the art can appreciate that the present invention can also be realized in embodiments of different shaped display panels with different placements of different shaped physical keys facilitating the detections of touch sliding movements in directions other than along the vertical and/or horizontal axis.

Figure 6:
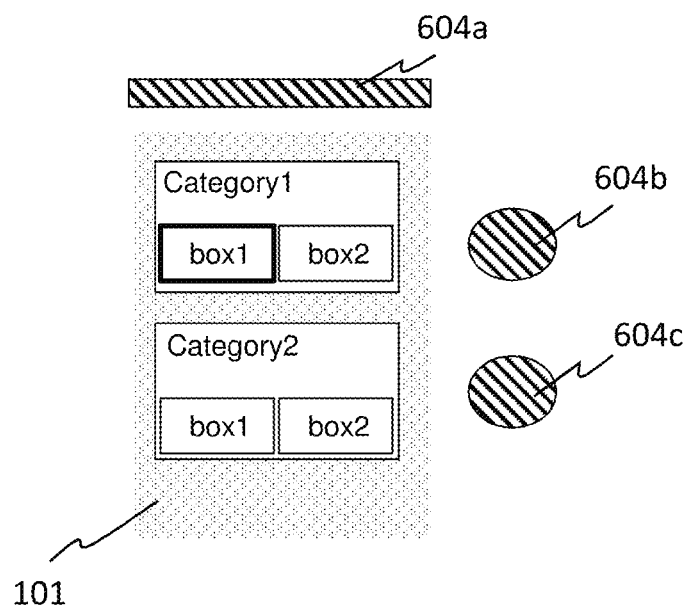
FIG. 6 depicts an exemplary configuration of physical keys embedded alongside a touch-sensing enabled display panel in accordance with another embodiment of the present invention.

FIG. 6 depicts another configuration of physical key in accordance with a further embodiment of the present invention. In this embodiment, the physical keys may include a first key 604a positioned adjacent to a horizontal top edge of the touch-sensing enabled display panel 101 to serve as a first off-screen key, a pair of second and third keys 604b and 604c positioned adjacent to a vertical right edge of the touch-sensing enabled display panel 101 to serve as a pair of second and third off-screen keys respectively. Accordingly, the first key 604a may be used, in association with the display panel, to detect an upward/downward sliding movement gesture along the vertical axis of the display panel 101; and each of the second and third keys 604b and 604c may be used respectively, in association with the display panel, to detect a rightward/leftward sliding movement gesture along the horizontal axis of the display panel.

Figure 7:
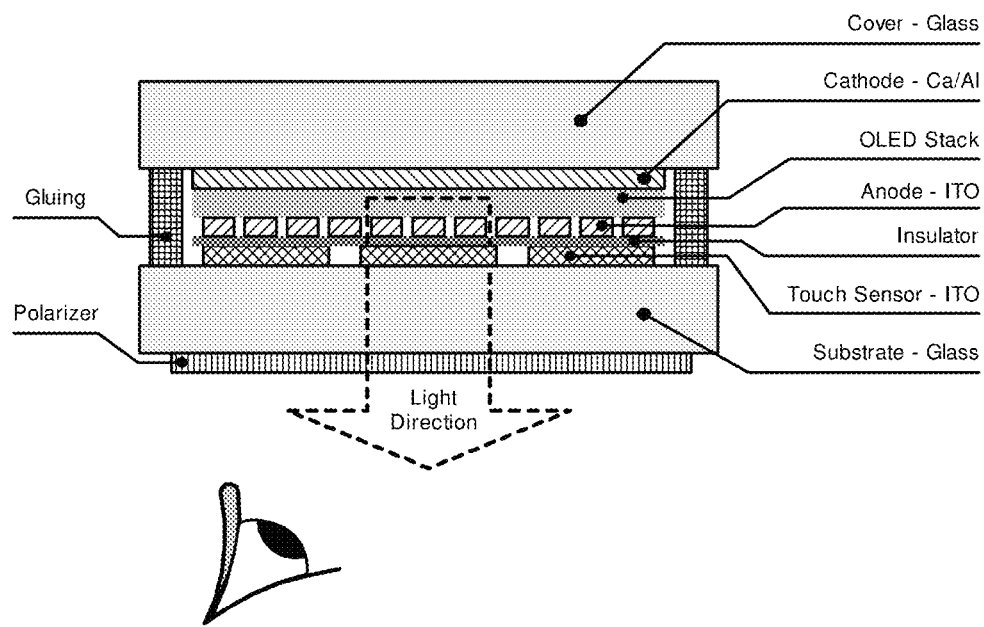
FIG. 7 depicts an in-cell touch sensor arrangement for a touch-sensing-enabled PMOLED display panel in accordance with an embodiment of the present invention.

In one preferred embodiment, the touch-sensing-enable display panel 101 may have an in-cell touch sensor arrangement as shown in FIG. 7, wherein the touch sensors are put in-between an upper cover glass and a lower substrate glass. As an example and not by way of limitation, the touch-sensing-enable display panel 101 may further comprise an electroluminescent layer sandwiched between a first plurality of electrodes and a second plurality of electrodes. The electroluminescent layer may be substantially composed of an organic material such that the electroluminescent layer and the first and second pluralities of electrodes collectively form a passive matrix organic light emitting diode (PMOLED) array. In the PMOLED array, the second plurality of electrodes may be a set of anode electrodes, and the first plurality of electrodes may be a set of cathode electrodes. The touch sensors are isolated from the anode electrodes by a very thin layer of insulator.

Figure 8:
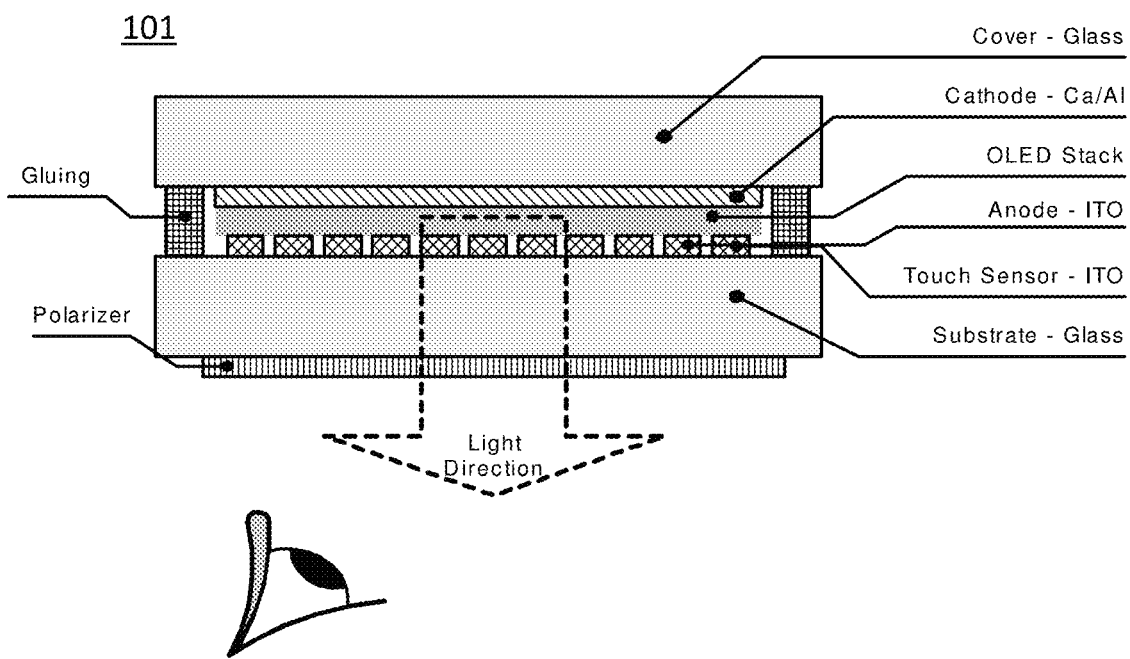
FIG. 8 depicts a compact in-cell touch sensor arrangement for a touch-sensing-enabled PMOLED display panel in accordance with an embodiment of the present invention.

In another preferred embodiment, the touch-sensing-enabled display panel 101 may be a PMOLED display panel having a touch sensor arrangement as shown in FIG. 8, wherein the anode electrodes are merged with the touch sensors so that the anode electrodes are used for both display-driving and touch-sensing. In this arrangement, the display driving and touch sensing functions are time-multiplexed. That is, within a duty cycle, the panel is either in display driving mode or in touch sensing mode but not both. In a typical application for a PMOLED display with a frame refresh rate of around 100 Hz, the display driving mode may take up 90% of the duty cycle while the touch sensing mode may take up 10% of the duty cycle. However, similar to aforementioned in-cell touch arrangement, the anode layer and the cathode layer are in close proximity as the OLED stack layer is only 1um thick. Hence, the capacitive coupling between the anode layer and cathode layer is high, resulting in a parasitic capacitance which is much bigger than the induced capacitance coming from an approaching finger. Also similar to the in-cell touch arrangement, the display driver and touch controller integration is feasible. An ordinarily skilled person in the art can appreciate that the present invention can also be adapted to other in-cell and out-cell touch arrangements without undue experimentation or deviation from the spirit of the present invention.

Figure 9:
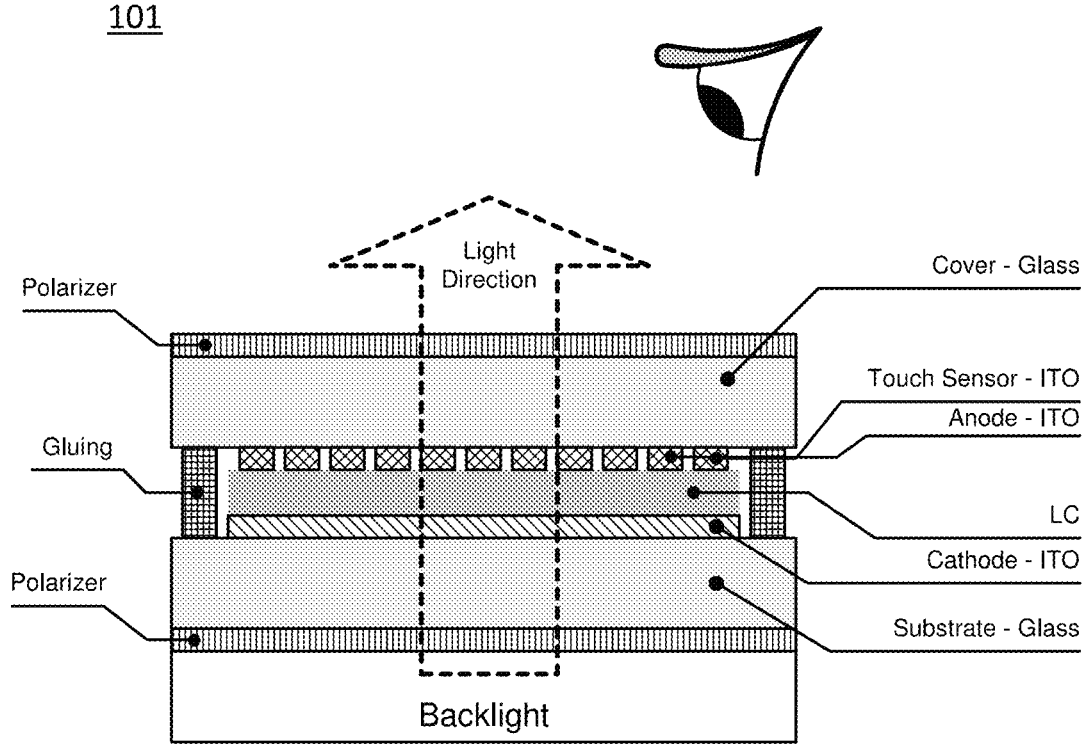
FIG. 9 depicts a compact in-cell touch sensor arrangement for a touch-sensing-enabled LCD display panel in accordance with another embodiment of the present invention.

Although the present invention is particularly useful when the touch-sensing-enabled display panel is realized by a PMOLED array, the present invention is not limited only to PMOLED. The present invention is applicable to any other types of display panels realized by any electroluminescent material, organic or inorganic. For example, the touch-sensing-enabled display panel 101 may be an LCD panel, which can be a twisted nematic (TN) LCD panel or a super twisted nematic (STN) LCD panel, as shown in FIG. 9. In this implementation, the touch-sensing-enable display panel 101 may at least comprise a liquid crystal (LC) layer sandwiched between a plurality of cathode electrodes and a plurality of anode electrodes; and a backlight system positioned below a lower substrate glass. Similar to the configuration of FIG. 8, the anode electrodes are merged with the touch sensors so that the anode electrodes are used for both display-driving and touch-sensing.

In the foregoing description for illustrating the present invention, anode electrodes are used as touch sensors. Those skilled in the art will appreciate that cathode electrodes can also be used as touch sensors without departing from the spirit of the present invention. The present invention is applicable regardless of whether anode electrodes or cathode electrodes are chosen as the touch sensors.

Referring back to FIGS. 1A and 1B, the touch-sensing controller 103 or the processor 105 may further comprise a multiplexing and summing network (MSN) for performing multiplexing and summing on the touch-sensing signals received from the display panel to produce one or more output-channel signals. In particular, the multiplexing and the summing are reconfigurable such that the touch-sensing signals are dynamically selected for summing to produce various combinations of the output-channel signals. The reconfigure-ability of the multiplexing and the summing enables implementation of touch sensing adaptive to graphical user interface.

The embodiments disclosed herein may be implemented using a specially configured computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the computing device, computer processor, or programmable logic device can readily be prepared by practitioners skilled in the software or electronic art based on the teachings of the present disclosure The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computing device for interacting with a user, comprising:

a touch-sensing enabled display panel comprising one or more touch sensors for sensing an on-screen touch on the display panel to generate on-screen touch-sensing signals;
one or more physical keys being positioned adjacent to edges of the display panel and configured to serve as off-screen keys for sensing an off-screen touch to generate off-screen touch-sensing signals; and
a processor configured to be communicable with the display panel and the physical keys, to receive and analyze the on-screen touch-sensing signals and off-screen touch-sensing signals for identifying a touch gesture;
wherein the identifying of the touch gesture comprises:
a) determining an on-screen touch time from the on-screen touch-sensing signals;
b) determining an off-screen touch time from the off-screen touch-sensing signals;
c) determining whether the touch gesture is a directional movement by comparing a time difference between the on-screen touch time and the off-screen touch time to a threshold, wherein the touch gesture is determined to be a directional movement between the display panel and the physical keys when the time difference is equal or less than the threshold; and
d) determining direction of the directional movement, when the touch gesture is determined to be a directional movement between the display panel and the physical keys, in accordance with sequence of occurrence of the on-screen touch and the off-screen touch; and
wherein the processor comprises a multiplexing and summing network (MSN) for performing multiplexing and summing on the on-screen touch-sensing signals received from the display panel to produce one or more output-channel signals, wherein the multiplexing and the summing are reconfigurable such that touch-sensing signals are dynamically selected for summing to produce combinations of the output-channel signals adaptive to various graphical user interface.

2. The computing device of claim 1, further comprising:
a display driver configured for driving the display panel to display a graphical user interface including one or more on-screen keys corresponding to a configuration of the touch sensors;
wherein the processor being further configured to, in response to an identified touch gesture, generate a new graphical user interface bitmap for the display driver to reconfigure the graphical user interface being displayed in the display panel.

3. The computing device of claim 2, wherein the reconfiguration of the graphical user interface includes switching between items and scrolling of contents in the graphical user interface.

4. The computing device of claim 1, wherein the physical keys include a first key positioned adjacent to a first horizontal edge of the display panel to serve as a first off-screen key and a second key positioned adjacent to a first vertical edge of the display panel to serve as a second off-screen key; wherein:
the first off-screen key is used, in association with the display panel, to detect an inward movement from outside of the display panel to within the display panel or outward movement from within the display panel to outside of the display panel along the vertical axis of the display panel; and
the second off-screen key is used, in association with the display panel, to detect an inward movement from outside of the display panel to within the display panel or outward movement from within the display panel to outside of the display panel along the horizontal axis of the display panel.

5. The computing device of claim 4, wherein the physical keys further include a third key positioned adjacent to a second horizontal edge of the display panel to serve as a third off-screen key and a fourth key positioned adjacent to a second vertical edge of the display panel to serve as a fourth off-screen key; wherein:
the third off-screen key is used, in association with the display panel, to detect an inward movement from outside of the display panel to within the display panel or outward movement from within the display panel to outside of the display panel along the vertical axis of the display panel; and
the fourth off-screen key is used, in association with the display panel, to detect an inward movement from outside of the display panel to within the display panel or outward movement from within the display panel to outside of the display panel along the horizontal axis of the display panel.

6. The computing device of claim 1, wherein the physical keys include a first key positioned adjacent to a first horizontal edge of the display panel to serve as a first off-screen key and a pair of second and third keys positioned adjacent to a first vertical edge of the display panel to serve as a pair of second and third off-screen key; wherein:
the first off-screen key is used, in association with the display panel, to detect an inward movement from outside of the display panel to within the display panel or outward movement from within the display panel to outside of the display panel along the vertical axis of the display panel; and
each of the second and third off-screen keys are used respectively, in association with the display panel, to detect an inward movement from outside of the display panel to within the display panel or outward movement from within the display panel to outside of the display panel along the horizontal axis of the display panel.

7. The computing device of claim 1, wherein the touch-sensing-enable display panel further comprises a first and second pluralities of electrodes and the second plurality of electrodes being merged with the touch sensors and used for both display-driving and touch-sensing in a time-multiplexing manner.

8. The computing device of claim 7, wherein the touch-sensing-enable display panel further comprises an electroluminescent layer being sandwiched between the first and second plurality of electrodes and substantially composed of an organic material such that the electroluminescent layer and the first and second pluralities of electrodes collectively form a passive matrix organic light emitting diode (PMOLED) array.

9. The computing device of claim 7, wherein the touch-sensing-enable display panel is a liquid crystal display (LCD) panel comprising a liquid crystal layer sandwiched between the first and second plurality of electrodes.

10. A computing device for interacting with a user, comprising:
a touch-sensing enabled display panel comprising one or more touch sensors for sensing an on-screen touch on the display panel to generate on-screen touch-sensing signals;
one or more physical keys being positioned adjacent to edges of the display panel and configured to serve as off-screen keys for sensing an off-screen touch to generate off-screen touch-sensing signals; and a processor configured to be communicable with the display panel and the physical keys, to receive and analyze the on-screen touch-sensing signals and off-screen touch-sensing signals for identifying a touch gesture;

wherein the identifying of the touch gesture comprises:
a) determining an on-screen touch time from the on-screen touch-sensing signals;
b) determining an off-screen touch time from the off-screen touch-sensing signals;
c) determining whether the touch gesture is a directional movement by comparing a time difference between the on-screen touch time and the off-screen touch time to a maximum threshold and a minimum threshold, wherein the touch gesture is determined to be a directional movement between the display panel and the physical keys when the time difference is less than the maximum threshold and larger than the minimum threshold; and
d) determining direction of the directional movement, when the touch gesture is determined to be a directional movement between the display panel and the physical keys, in accordance with sequence of occurrence of the on-screen touch and the off-screen touch; and wherein the processor comprises a multiplexing and summing network (MSN) for performing multiplexing and summing on the on-screen touch-sensing signals received from the display panel to produce one or more output-channel signals, wherein the multiplexing and the summing are reconfigurable such that touch-sensing signals are dynamically selected for summing to produce combinations of the output-channel signals adaptive to various graphical user interface.

11. The computing device of claim 10, further comprising:
a display driver configured for driving the display panel to display a graphical user interface including one or more on-screen keys corresponding to a configuration of the touch sensors;
wherein the processor being further configured to, in response to an identified touch gesture, generate a new graphical user interface bitmap for the display driver to reconfigure the graphical user interface being displayed in the display panel.

12. The computing device of claim 11, wherein the reconfiguration of the graphical user interface includes switching between items and scrolling of contents in the graphical user interface.

13. The computing device of claim 10, wherein the physical keys include a first key positioned adjacent to a first horizontal edge of the display panel to serve as a first off-screen key and a second key positioned adjacent to a first vertical edge of the display panel to serve as a second off-screen key; wherein:
the first off-screen key is used, in association with the display panel, to detect an inward movement from outside of the display panel to within the display panel or outward movement from within the display panel to outside of the display panel along the vertical axis of the display panel; and
the second off-screen key is used, in association with the display panel, to detect an inward movement from outside of the display panel to within the display panel or outward movement from within the display panel to outside of the display panel along the horizontal axis of the display panel.

14. The computing device of claim 13, wherein the physical keys further include a third key positioned adjacent to a second horizontal edge of the display panel to serve as a third off-screen key and a fourth key positioned adjacent to a second vertical edge of the display panel to serve as a fourth off-screen key; wherein:
the third off-screen key is used, in association with the display panel, to detect an inward movement from outside of the display panel to within the display panel or outward movement from within the display panel to outside of the display panel along the vertical axis of the display panel; and
the fourth off-screen key is used, in association with the display panel, to detect an inward movement from outside of the display panel to within the display panel or outward movement from within the display panel to outside of the display panel along the horizontal axis of the display panel.

15. The computing device of claim 10, wherein the physical keys include a first key positioned adjacent to a first horizontal edge of the display panel to serve as a first off-screen key and a pair of second and third keys positioned adjacent to a first vertical edge of the display panel to serve as a pair of second and third off-screen key; wherein:
the first off-screen key is used, in association with the display panel, to detect an inward movement from outside of the display panel to within the display panel or outward movement from within the display panel to outside of the display panel along the vertical axis of the display panel; and
each of the second and third off-screen keys are used respectively, in association with the display panel, to detect an inward movement from outside of the display panel to within the display panel or outward movement from within the display panel to outside of the display panel along the horizontal axis of the display panel.

16. The computing device of claim 10, wherein the touch-sensing-enable display panel further comprises a first and second pluralities of electrodes and the second plurality of electrodes being merged with the touch sensors and used for both display-driving and touch-sensing in a time-multiplexing manner.

17. The computing device of claim 16, wherein the touch-sensing-enable display panel further comprises an electroluminescent layer being sandwiched between the first and second plurality of electrodes and substantially composed of an organic material such that the electroluminescent layer and the first and second pluralities of electrodes collectively form a passive matrix organic light emitting diode (PMOLED) array.

18. The computing device of claim 16, wherein the touch-sensing-enable display panel is a liquid crystal display (LCD) panel comprising a liquid crystal layer sandwiched between the first and second plurality of electrodes.

* * * * *